United States Patent [19]

Donze et al.

[11] Patent Number: 5,071,105
[45] Date of Patent: Dec. 10, 1991

[54] GAS TORCH WITH VISUAL OBSERVATION DEVICE

[75] Inventors: Michel Donze; Bertrand Donze, both of Liverdun, France

[73] Assignee: Sollac, Puteaux, France

[21] Appl. No.: 576,449

[22] PCT Filed: Mar. 20, 1989

[86] PCT No.: PCT/FR89/00123
§ 371 Date: Sep. 12, 1990
§ 102(e) Date: Sep. 12, 1990

[87] PCT Pub. No.: WO89/09109
PCT Pub. Date: Oct. 5, 1989

[30] Foreign Application Priority Data

Mar. 21, 1988 [FR] France .................. 88 03627

[51] Int. Cl.$^5$ .............................................. B23K 5/00
[52] U.S. Cl. ..................................... 266/51; 266/100
[58] Field of Search ................. 266/51, 48, 100, 99

[56] References Cited

U.S. PATENT DOCUMENTS 4,450,339 5/1984 Corby, Jr. .................. 219/124.34

FOREIGN PATENT DOCUMENTS 1421919 1/1976 United Kingdom .

OTHER PUBLICATIONS

Patent Abstracts of Japan, vol. 9, No. 92 (M-373)(1815), 4-20-85, JP,A,59218294.

Primary Examiner—S. Kastler
Attorney, Agent, or Firm—Griffin, Branigan & Butler

[57] ABSTRACT

The torch fitted with a nozzle (6) comprises a visual observation optical device having one end part coaxially inside the central gas feed pipe (7) and the other end extending outside the body (1) at the opposite end to the nozzle; the optical device being situated a specific distance from the main orifice (17) of the nozzle so that the bounds of its angle of view pass through the edges of said main orifice.

7 Claims, 2 Drawing Sheets

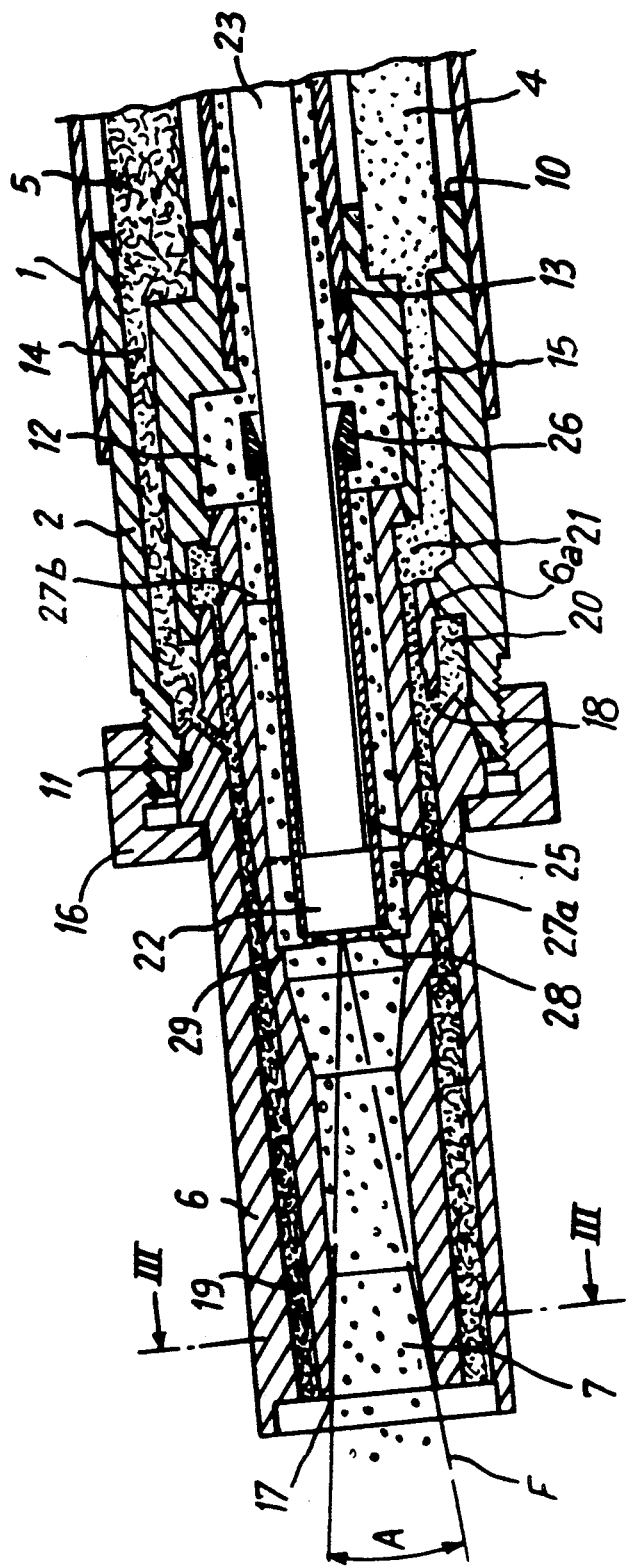
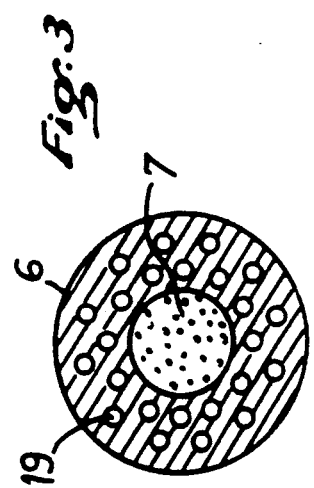

GAS TORCH WITH VISUAL OBSERVATION DEVICE

The invention concerns a gas torch with a device permitting visual observation of a molten pool produced by the torch, more particularly intended for use in scarfing torches, i.e for removing blemishes, cracks, tears, inclusions from the surface of steel billets, ingots and the like.

Intermediate products of the iron and steel industry such as slabs, blooms and billets of steel, for example, are generally converted into flat products by hot rolling, whether they were initially cast into ingots or continuously cast.

With saving energy and reducing production costs being a continuous preoccupation, iron and steel industry specialists seek to obtain the maximum benefit from the heat content of the cast intermediate product in carrying out the rolling operation.

However, the intermediate products may have near their surface visible and invisible defects such as cracks, tears, shuts or the like which may remain in the rolled product or even become accentuated and lead to their rejection, not to mention the possibility of damaging the surface of the rolling mill rolls.

For this reason it is necessary to examine the intermediate products before they are rolled to determine if they may be rolled directly or if they first require treatment to eliminate or repair defects or if their quality is so poor that they must be recycled.

Until now the methods and equipment used for this examination to detect defects has required the intermediate product to be cool beforehand; this was directly opposed to the preoccupation with saving energy.

It is known to observe a pool of molten metal produced by a gas torch using a video camera independent of the torch and disposed near the pool, for example to monitor the removal of tears from the surface of metal ingots before they are rolled.

When observing the pool the camera and the ancillary equipment may be splashed with molten metal from around the pool and are exposed to the heat of the torch flame and of the pool itself. The severe environment exposes the equipment (camera, etc) to significant risk of damage and makes it impossible to view the pool from close up. What is more, the smoke produced by melting the pool significantly degrades the quality of the image and this means that it is not possible to detect small tears or other defects.

There is known from the patent U.S. Pat. No. 4,450,339 an arc welding torch having an optical system providing an image of a welded area to enable adjustment of the position of an electrode and of the current fed to it. The torch described has various disadvantages. The optical system is protected by a quartz window far from the hot area which delimits the angle view of the optical system. This window may be damaged or soiled by spatter due to the electrical arc, the low flowrate of rare gas used to create a neutral atmosphere being insufficient to repel such spatter.

A main object of the invention is therefore the observation of a molten pool produced by a torch without any of the disadvantages mentioned above.

To this end, the invention consists in a gas torch having a body having at least one gas feed pipe provided at one end with a nozzle having a main orifice and a visual observation optical device comprising a lens coaxial with the main orifice of the nozzle and an optical fibre.

In accordance with the invention, the lens is disposed inside the feed pipe, leaving sufficient flow cross-section for the gas, which flows over it during operation of the torch, with the result that the surface area of the main orifice substantially matches that embraced by the angle of view of the lens and the optical fibre has an end part starting from the lens and extends in a gas-tight manner to the outside of the body towards a device for interpretation of light information.

The flow of gas over the optical device repels spatter from the molten pool and keeps the lens clean. It also cools the device and so enables the lens to be moved nearer the nozzle, increasing the angle of view and the area of the molten pool that is viewed.

According to one advantageous characteristic of the invention a rigid guide tube extends the pipe to protect and support the optical fibre between said pipe and a connector external to the torch body.

The opposite, inner end of the rigid guide tube preferably communicates with a gas feed chamber fed by an off-axis gas feed pipe discharging transversely into the latter.

According to another characteristic, the end part of the optical device inside the gas feed pipe is inside a tube comprising at least means for centring the tube in said pipe and an abutment for the optical device in the tube.

BRIEF DESCRIPTION OF DRAWINGS

Other characteristics and advantages of the invention will emerge from the following description of one non-limiting embodiment of the invention given with reference to the appended drawings in which:

FIG. 2 is a partial view in axial cross-section offset angularly relative to FIG. 1 and showing the front part of a gas torch equipped with a visual observation optical device in accordance with the invention;

FIG. 3 is a cross-section on the line III—III in FIG. 2.

Referring to FIGS. 1 and 2, there is shown a gas torch, for example an oxy-acetylene scarfing torch, equipped with an optical device permitting visual observation of a molten pool produced by the torch.

Figure 1:
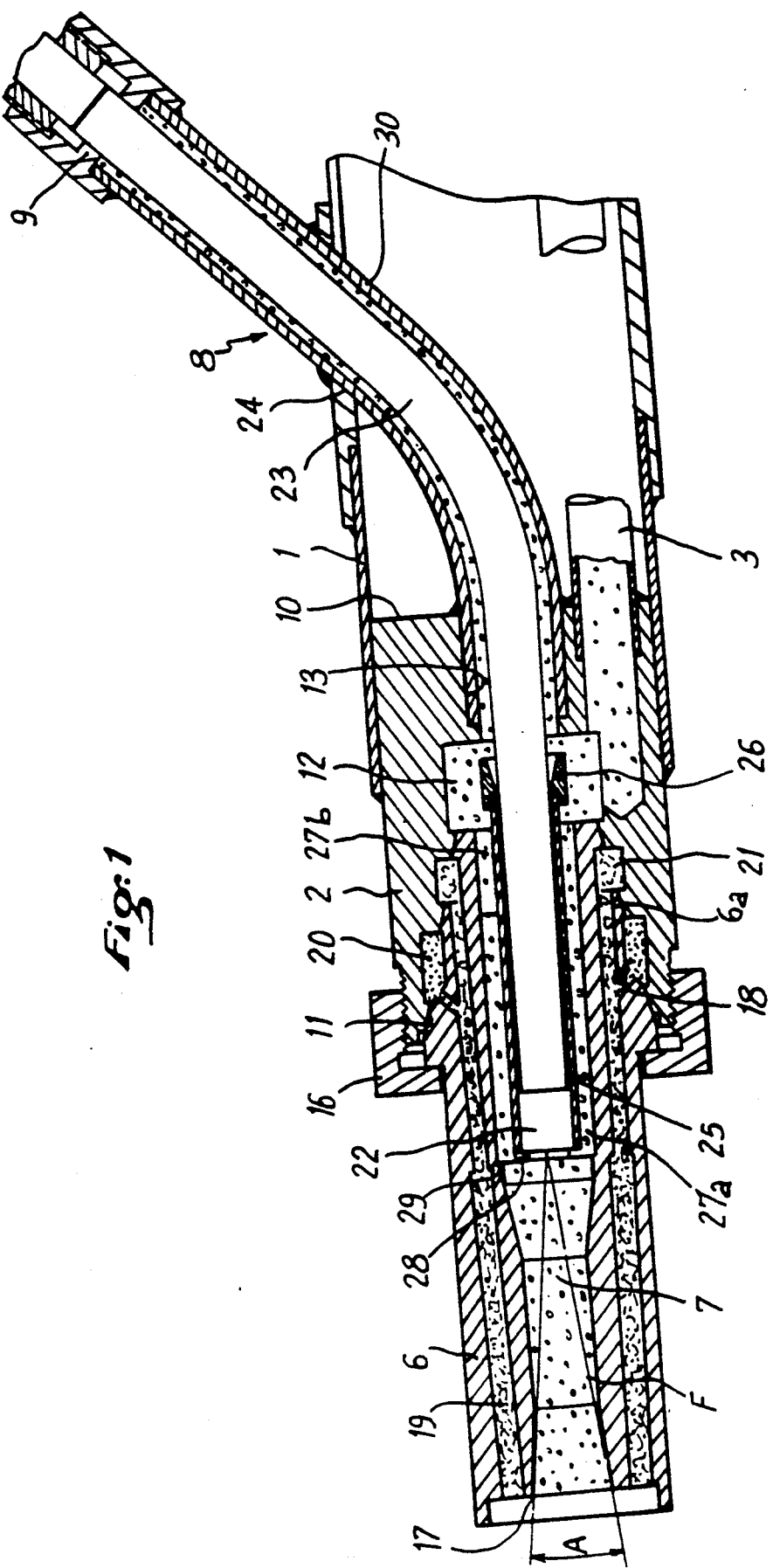
FIG. 1 is a partial view in axial cross-section of a gas torch fitted with a visual observation optical device in accordance with the invention.

The torch has a cylindrical hollow body 1 and a torch head 2 fixed in a sealed way into the front part of the body (on the left in FIGS. 1 and 2) through which pass two oxygen feed pipes 3, 4 and an acetylene feed pipe 5. The torch also has a scarfing nozzle 6 which is generally cylindrical and has a central oxygen feed pipe 7 connected to the oxygen feed pipe 3.

According to the invention, the torch includes a visual observation optical device 8—to be described later—an end part of which extends coaxially into the torch, this device being connected at its opposite end, outside the body 1, to a receiver, for example a camera, by means of a connector 9.

The torch head includes in its rear part the ends of the three gas feed pipes 3, 4, 5 disposed off-centre and fixed in the conventional way to the rear surface 10 of the head 2. These pipes are connected at their opposite end to the corresponding gas supply.

The torch head includes a central chamber 12 into which discharges a rear bore 13 which opens towards the front into a conical bearing surface 11 adapted to receive in a sealed way the fixing end 6a of the nozzle 6. The bore 13 receives and guides the part of the optical device 8 located inside the head 2.

The chamber 12 is fed through the pipe 3 with oxygen which can flow to the pipe 7 through a central passage in the nozzle 6. The pipe 7 has a cylindrical portion in its rear part (on the right in FIGS. 1 and 2) which receives the optical device and a venturi-shaped part at the front which discharges into a main central orifice 17.

Grooves machined into the bearing surface 11 constitute annular chambers, of which one annular chamber 20 is fed with acetylene by a pipe 14, 5 and the other annular chamber 21 is fed with oxygen by a pipe 15, 4. These chambers communicate through a plurality of injection pipes 18 in pipes 19 for mixing the gases and allowing them to expand ready for combustion at the outlet from the nozzle 6.

The torch in accordance with the invention includes a visual observation optical device 8 comprising a lens 22 and an optical fibre 23 extending coaxially inside the central inlet pipe 7 of the nozzle 6, through the bore 13 opening onto the rear surface 10 of the torch head, to leave the body through an opening 24 opposite the nozzle 6.

The end part of the optical device including the lens and part of the length of the fibre 23 housed inside the central oxygen feed pipe 7 is disposed inside a tube 25.

This tube has an outwardly flared rear end 26 to facilitate the insertion of the optical device into the tube.

The tube has at each end a respective bush 27a, 27b for centring the inner tube of the rear part of the central oxygen feed pipe of the nozzle. The bushes 27a, 27b have three fins for correct centring without impeding the flow of gas.

Of course, a longitudinal bush of the same kind could be provided over the entire length of the tube 25, or any other appropriate centring means allowing the gas to flow.

Note that the bush 27a at the same end as the lens has an abutment surface 28 against which the lens 23 bears and that this bush also rests against a shoulder 29 formed at the front end of the cylindrical part of the central pipe of the nozzle. The lens is therefore held at a specific distance from the orifice of the nozzle so that the bounds of its angle of view A pass through the edges of the main central orifice 17 of the nozzle. The optics of the lens and in particular its long focal length are preferably such that the angle of view A is approximately 13°.

Note also that when the nozzle is changed the optical device is protected by the tube and is held in a position substantially coaxial with the central oxygen feed pipe 7, which facilitates fitting the new nozzle.

As seen in FIGS. 1 and 2, cold pure oxygen flows over the part of the optical device disposed in the hot chamber of the nozzle and this efficiently protects the optical device from heat and from spattered molten metal, the flow of oxygen preventing penetration of the latter into the nozzle. This arrangement of the optical device inside the torch enables the molten pool to be observed from close up and improves the quality of the image to the point where it is possible to detect tears or similar defects of very small size.

Rearward of the part of the optical fibre located in the central oxygen feed pipe, the optical fibre 23 extends outside the body in a rigid guide tube 30 inserted in the bore 13. The tube 30 extends away from the head 2, initially inside the body 1 before leaving the latter through the opening 24 provided for this purpose, to the edge of which it is brazed.

Note that the inner end of the tube disposed in the rear part of the torch head communicates with the oxygen feed chamber.

Finally, FIG. 3 shows a transverse cross-section through the front part of the nozzle showing the arrangement of the oxy-acetylene mixture feed pipes 19 relative to the central oxygen feed pipe 7 of the nozzle.

Of course, the diameter of the part of the central feed pipe 7 receiving the optical device 8 has been increased relative to the diameter of a central feed pipe of a nozzle which does not contain any optical device, in order to obtain an oxygen flow cross-section commensurate with the required flowrate.

We claim:

1. A combustible gas torch comprising:
   (1) an elongated body having at least one gas feed pipe disposed therein with a first portion thereof extending to at least near a first end of the body and a second portion thereof extending to a combustible gas nozzle having a combustible gas outlet orifice which is coaxial with the second portion of the feed pipe;
   (2) a visually-observable optical device having:
      (a) a lens disposed in said second portion of said gas feed pipe, wherein said lens is coaxial with said orifice and is disposed from said orifice a distance sufficient that the angle of view of the lens substantially matches the area of the orifice; and
      (b) an optical fiber associates with said lens and extending out of said body in a gas-tight manner to a device for interpretation of light information; and
   (3) space between said lens and said second portion of said gas feed pipe such that the flow of the gas through the space and around the lens during operation of the torch is sufficient that contaminations produced at the nozzle during operation of the torch are prevented from travelling through said nozzle and to said lens.

2. Torch according to claim 1 wherein a rigid guide tube extends from the gas feed pipe to protect and support the optical fiber between said pipe and a connector which is external to the said body.

3. Torch according to claim 2 wherein an opposite, inner end of the rigid guide tube communicates with a gas feed chamber fed by an off-center gas feed pipe discharging into the latter.

4. Torch according to claim 3 wherein an end part of the optical device disposed in the gas feed pipe lies inside a tube comprising means for centering the tube in said pipe and an abutment for the optical device.

5. Torch according to claim 4 wherein the centering means are fins fixed to the tube.

6. Torch according to claim 1 wherein the gas feed pipe is an oxygen feed pipe.

7. Torch according to claim 1 wherein the angle of view of the lens is substantially equal to 13°.

* * * * *